(12) United States Patent
Nishimori et al.

(10) Patent No.: US 12,049,284 B2
(45) Date of Patent: Jul. 30, 2024

(54) MOTOR UNIT FOR USE IN ELECTRIC BICYCLES, AND ELECTRIC BICYCLE

(71) Applicant: Panasonic Intellectual Property Management Co., Ltd., Osaka (JP)

(72) Inventors: Masato Nishimori, Hyogo (JP); Masafumi Kawakami, Nara (JP); Ryohei Adachi, Nara (JP); Fuhito Umegaki, Osaka (JP); Takehiro Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 983 days.

(21) Appl. No.: 17/259,188

(22) PCT Filed: Feb. 26, 2019

(86) PCT No.: PCT/JP2019/007302
§ 371 (c)(1),
(2) Date: Jan. 10, 2021

(87) PCT Pub. No.: WO2019/176528
PCT Pub. Date: Sep. 19, 2019

(65) Prior Publication Data
US 2021/0269118 A1    Sep. 2, 2021

(30) Foreign Application Priority Data
Mar. 13, 2018 (JP) .................... 2018-046041

(51) Int. Cl.
*H02K 7/08* (2006.01)
*B62M 6/55* (2010.01)
(Continued)

(52) U.S. Cl.
CPC ............... *B62M 6/55* (2013.01); *H02K 7/083* (2013.01); *H02K 7/116* (2013.01); *H02K 11/33* (2016.01); *H05K 7/2039* (2013.01)

(58) Field of Classification Search
CPC .......... H02K 7/116; H02K 9/22; H02K 9/223; H02K 9/227; H02K 11/30; H02K 11/33
See application file for complete search history.

(56) References Cited

U.S. PATENT DOCUMENTS

2009/0289522 A1    11/2009 Buban
2010/0254093 A1*   10/2010 Oota ................... B60R 16/0239
                                                      361/720

(Continued)

FOREIGN PATENT DOCUMENTS

EP    2371697 A1    10/2011
EP    2940836 A1    11/2015

(Continued)

OTHER PUBLICATIONS

Man, Machine Translation of JP2015109386, Jun. 2015 (Year: 2015).*

(Continued)

*Primary Examiner* — Eric Johnson
(74) *Attorney, Agent, or Firm* — Renner, Otto, Boisselle & Sklar, LLP (57) ABSTRACT

A motor unit for use in electric bicycles, the motor unit comprising: a motor having a rotary shaft; a unit case to house the rotary shaft partially; an input shaft arranged in the unit case to penetrate through the unit case and to be rotatable around an axis; an input body configured to rotate along with the input shaft; an output body configured to rotate around the axis upon receiving rotational force of the input body; and a control board housed in the unit case and configured to control rotation of the motor. The unit case includes: a first heat dissipating portion connected to a first (Continued)

surface of the control board; and a second heat dissipating portion connected to a second surface opposite from the first surface of the control board.

26 Claims, 9 Drawing Sheets

(51) Int. Cl.
*H02K 7/116* (2006.01)
*H02K 7/20* (2006.01)
*H02K 11/33* (2016.01)
*H05K 7/20* (2006.01)

(56) References Cited

U.S. PATENT DOCUMENTS

| | | | |
|---|---|---|---|
| 2013/0187517 | A1 | 7/2013 | Asao et al. |
| 2016/0285324 | A1 | 9/2016 | Carrasco et al. |
| 2017/0313383 | A1 * | 11/2017 | Uda ................ B62M 11/02 |

FOREIGN PATENT DOCUMENTS

| | | | | |
|---|---|---|---|---|
| EP | 2998211 | A1 | | 3/2016 |
| JP | H3-52551 | A | | 3/1991 |
| JP | 2001-186706 | A | | 7/2001 |
| JP | 2002-345185 | A | | 11/2002 |
| JP | 2004201492 | A | | 7/2004 |
| JP | 2007176354 | A | * | 7/2007 |
| JP | 2008-131827 | A | | 6/2008 |
| JP | 2009-130945 | A | | 6/2009 |
| JP | 2011-156912 | A | | 8/2011 |
| JP | 2011-207362 | A | | 10/2011 |
| JP | 2014-196080 | A | | 10/2014 |
| JP | 2014196080 | A | * | 10/2014 ............ B62M 11/02 |
| JP | 2015109386 | A | * | 6/2015 |
| JP | 2017-197131 | A | | 11/2017 |
| WO | 2014/184826 | A1 | | 11/2014 |
| WO | WO-2014184826 | A1 | * | 11/2014 ............ B62M 6/50 |

OTHER PUBLICATIONS

Ishikawa, Machine Translation of JP2014196080, Oct. 2014 (Year: 2014).*
Matsuo, Machine Translation of JP2007176354, Jul. 2007 (Year: 2007).*
Kawakami et al, Machine Translation of WO2014184826, Nov. 2014 (Year: 2014).*
International Search Report for corresponding Application No. PCT/JP2019/007302, mailed Apr. 9, 2019.
Office Action dated Aug. 29, 2023 issued for the related Japanese patent application No. JP2022-132748, with English Translation.
Office Action dated Aug. 29, 2023 issued for the related Japanese patent application No. JP2022-132749, with English Translation.
Non-Final Office Action issued Feb. 1, 2024, for co-pending U.S. Appl. No. 18/078,341.
Office Action dated Feb. 13, 2024 issued for the related Japanese patent application No. JP2022-132749, with English Translation.

* cited by examiner

MOTOR UNIT FOR USE IN ELECTRIC BICYCLES, AND ELECTRIC BICYCLE

TECHNICAL FIELD

The present disclosure generally relates to a motor unit for use in electric bicycles and also relates to an electric bicycle.

BACKGROUND ART

Patent Literature 1 discloses an electric bicycle including a motor unit (i.e., an electric assist bicycle). In that motor unit, a motor is housed in a unit case that forms its shell. The unit case includes a motor case to house the motor. This motor case is resin-molded along with a stator of the motor by a molding technique.

The motor unit known from Patent Literature 1 described above still has room for improvement in terms of its capability of dissipating the heat generated when the motor is activated.

CITATION LIST

Patent Literature

Patent Literature 1: WO 2014/184826 A1

SUMMARY OF INVENTION

It is therefore an object of the present disclosure to provide a motor unit with improved heat dissipation capability for electric bicycles and also provide an electric bicycle including such a motor unit.

A motor unit according to one aspect of the present disclosure is designed to be used in electric bicycles. The motor unit includes a motor and a unit case to which the motor is fitted. The motor includes: a stator; a rotor arranged to be surrounded with the stator; a rotary shaft fixed to the rotor; and a metallic cup having an opening and configured to house the stator and the rotor at least partially. An inner peripheral surface of the metallic cup is in pressure contact with the stator.

An electric bicycle according to another aspect of the present disclosure includes the motor unit according to the one aspect; and at least one wheel to which rotational force is transmitted from the motor of the motor unit.

DESCRIPTION OF EMBODIMENTS

Exemplary Embodiment

Figure 1:
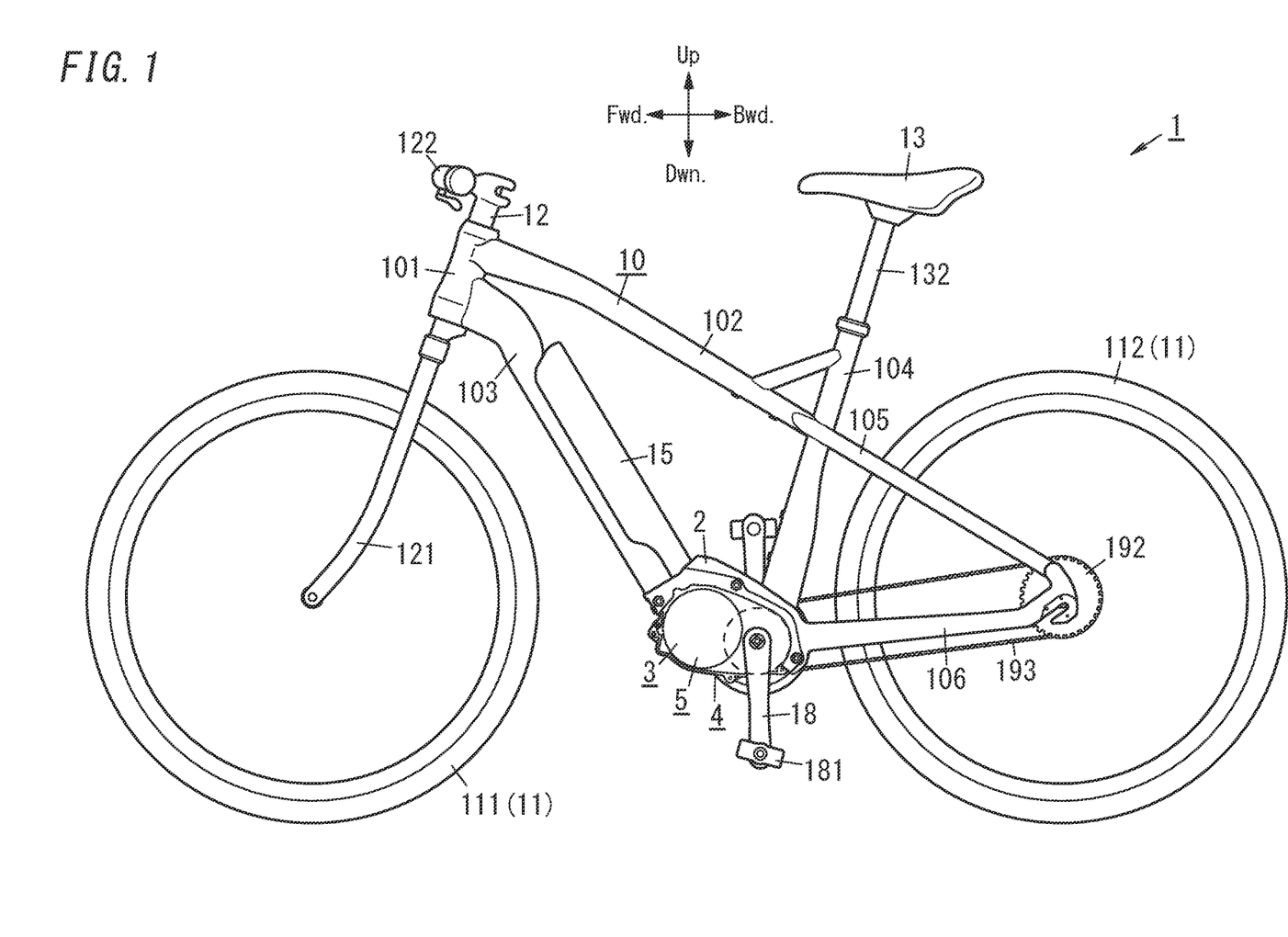
FIG. 1 is a side view of an electric bicycle according to an exemplary embodiment.

An electric bicycle 1 according to an exemplary embodiment is implemented as an electric assist bicycle. An electric bicycle 1 according to the exemplary embodiment includes: a frame 10; a motor unit 3 used for electric bicycles (hereinafter simply referred to as a "motor unit 3") which is mounted on the frame 10; and two wheels 11 which are rotatably coupled to the frame 10. The two wheels 11 are a front wheel 111 and a rear wheel 112. The rear wheel 112 is driven in rotation by the driving force supplied from the motor unit 3.

Note that in the following description, the respective directions, including the forward/backward directions and the rightward/leftward directions, are herein defined with respect to the rider of the electric bicycle 1. Specifically, the direction in which the rider who is riding the electric bicycle 1 travels by pedaling the electric bicycle 1 is the forward direction, and the opposite direction thereof is the backward direction. The direction pointing to the left when viewed from the rider is the leftward direction, and the direction pointing to the right when viewed from him or her is the rightward direction. The respective constituent elements thereof will be described in detail.

First, the frame 10 will be described.

As shown in FIG. 1, the frame 10 includes a head tube 101, a top tube 102, a down tube 103, a seat tube 104, seat stays 105, chain stays 106, and a bracket 2.

The frame 10 (i.e., the respective parts that form the frame 10) is typically made of a metal such as aluminum or stainless steel, which may contain a non-metallic material as well. Alternatively, the entire frame 10 may also be made of a non-metallic material. Thus, the frame 10 may be made of any material without limitation.

A handlebar stem 12 is inserted rotatably into the head tube 101. At the bottom of the handlebar stem 12, provided are forks 121, on which the front wheel 111 is mounted rotatably. To the top of the handlebar stem 12, fixed are handlebars 122.

A front end portion of the top tube 102 is fixed to the head tube 101. A rear end portion of the top tube 102 is fixed onto the seat tube 104. Into a hole at the top of the seat tube 104, inserted is a tube 132 extending downward from a saddle 13. Fixing the tube 132 onto the seat tube 104 allows the saddle 13 to be fixed. To the bottom of the seat tube 104, fixed is the bracket 2.

A front end portion of the down tube 103 is further fixed to the head tube 101. A rear end portion of the down tube 103 is fixed to the bracket 2.

Below the bracket 2, fixed is the motor unit 3. To a rear end portion of the bracket 2, fixed are respective front end portions of the chain stays 106.

To a rear end portion of the top tube 102, fixed are respective front end portions of the seat stays 105. The respective rear end portions of the seat stays 105 are coupled to the respective rear end portions of the chain stays 106. The rear wheel 112 is mounted rotatably on their coupling portions. On the down tube 103, a battery 15 for supplying power to the motor unit 3 is mounted removably.

Next, the motor unit 3 will be described.

Figure 2A:
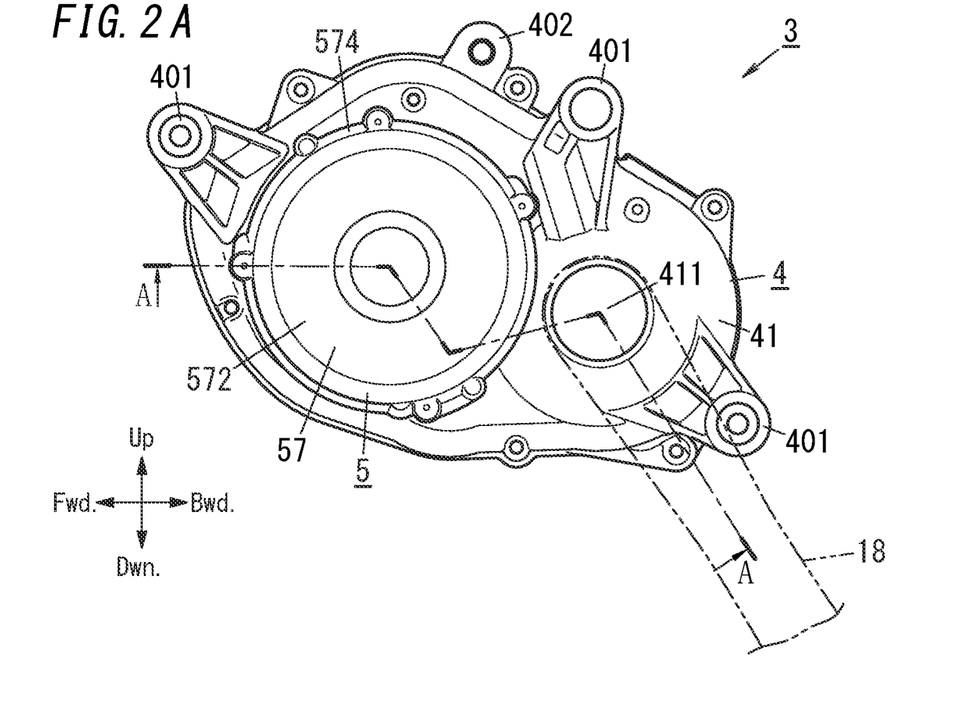
FIG. 2A is a side view of a motor unit equipped for the electric bicycle.
Figure 2B:
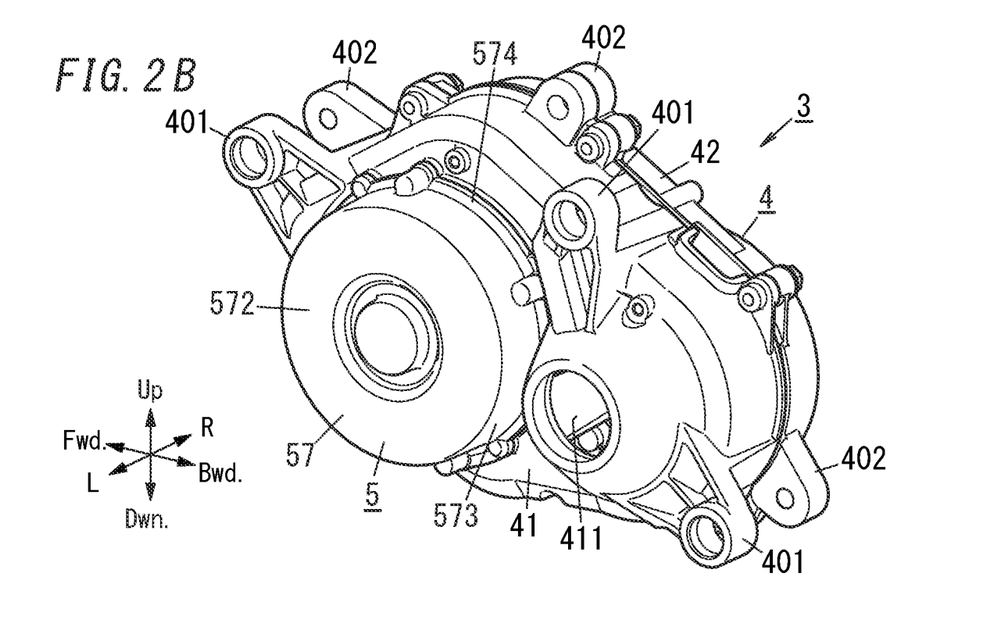
FIG. 2B is a perspective view of the motor unit.
Figure 3:
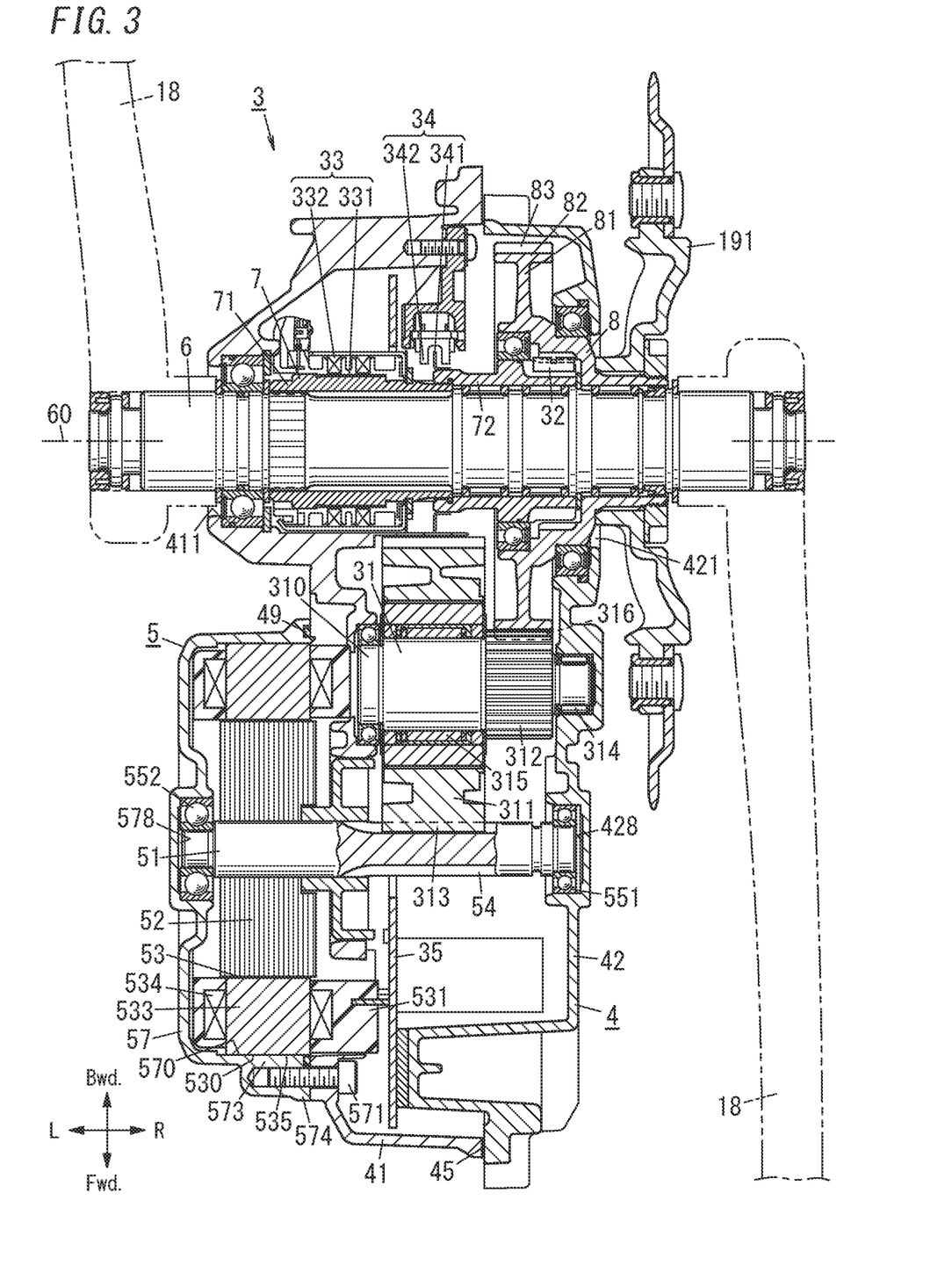
FIG. 3 is a cross-sectional view thereof taken along the plane A-A shown in FIG. 2A.

As shown in FIGS. 2A and 2B, the majority of the shell of the motor unit 3 is formed by a unit case 4. As shown in FIG. 3, a motor 5, operating as a drive source for driving the wheels 11 in rotation, is fitted into the unit case 4. The unit case 4 houses: a speed reducer 31 to which the rotational force of the motor 5 is transmitted; and a control board 35 for controlling the rotation of the motor 5. The unit case 4 further houses an input shaft 6, an input body 7, an output body 8, and other members.

To the outer surface of the unit case 4, fitted is a metallic cup 57 having the shape of a bottomed cylinder for housing principal parts of the motor 5. The metallic cup 57 has an opening, of which an opening edge portion 574 is coupled to the unit case 4.

Parts (such as a portion of a rotary shaft 51 to be described later), not housed in the metallic cup 57, of the motor 5 are housed in the unit case 4. A plurality of first mount pieces 401 and a plurality of second mount pieces 402, all of which are to be fixed to the bracket 2, protrude from the outer surface of the unit case 4.

The unit case 4 includes a first divided part 41 forming a left half of the unit case 4 and a second divided part 42 forming a right half of the unit case 4. The plurality of first mount pieces 401 protrudes from the first divided part 41 and the plurality of second mount pieces 402 protrudes from the second divided part 42. A hollow unit case 4 is formed by joining the first divided part 41 and the second divided part 42 together.

Figure 4:
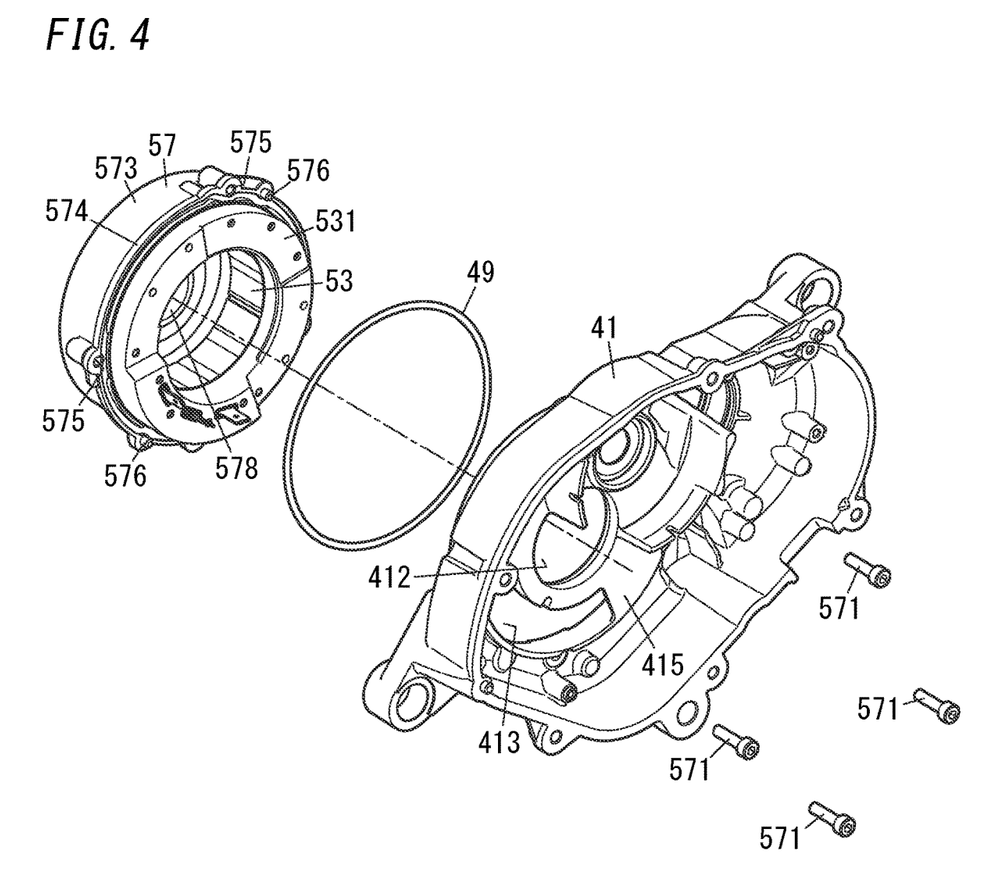
FIG. 4 is an exploded perspective view of principal parts of the motor unit.

As shown in FIGS. 3 and 4 and other drawings, the first divided part 41 has a space which is opened rightward. This space forms the left half of the housing space of the unit case 4. The first divided part 41 has a wall 415 in a region to face the motor 5. The wall 415 has a circular through hole 412 and an arc-shaped through hole 413, which is concentric with the through hole 412. Part (specifically, the rotary shaft 51 to be described later) of the motor 5 is inserted into the through hole 412. A power supply cable for the motor 5 and a resin portion molding the cable are passed through the through hole 413.

The second divided part 42 has a space which is opened leftward. This space forms the right half of the housing space of the unit case 4. The first divided part 41 and the second divided part 42 are joined together such that their respective spaces communicate with each other.

Figure 5:
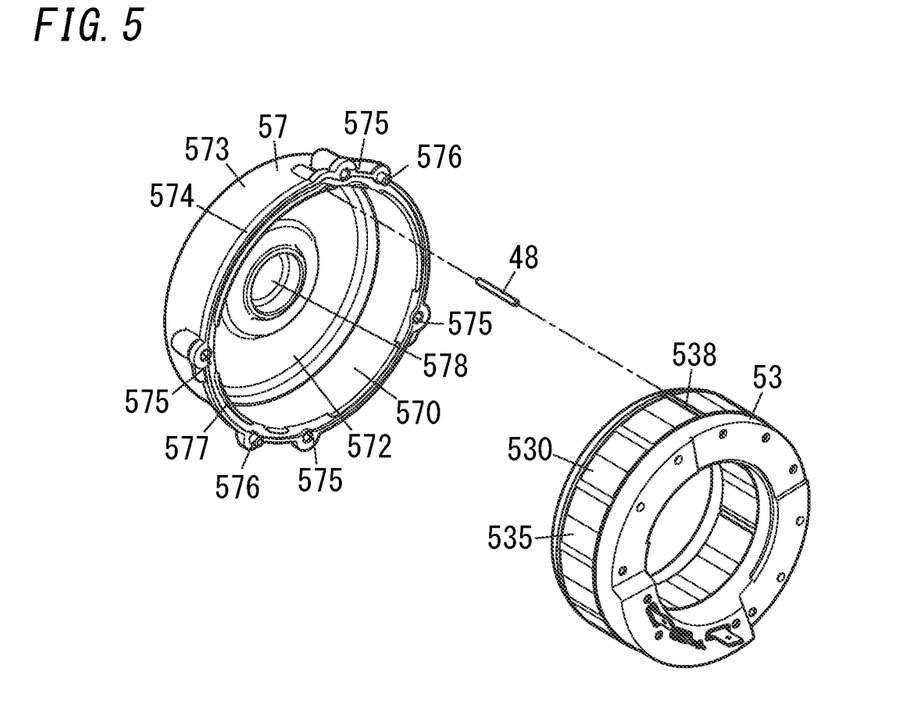
FIG. 5 is another exploded perspective view of some of the principal parts of the motor unit.
Figure 6:
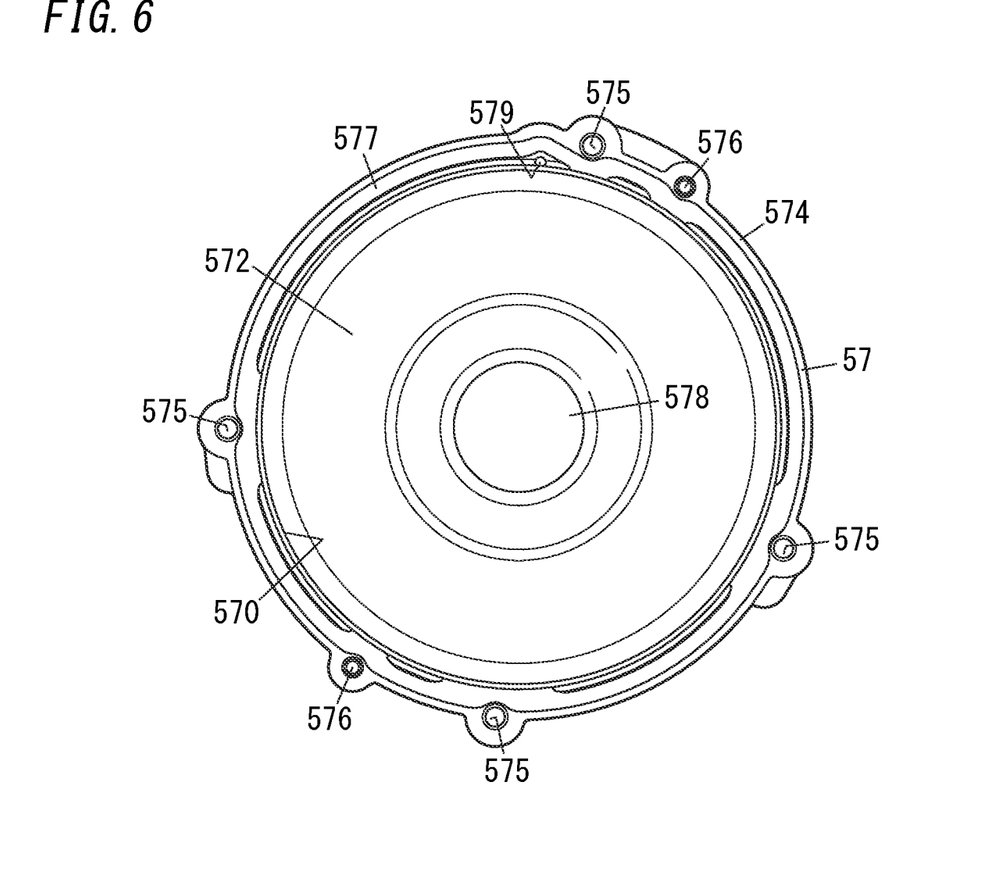
FIG. 6 is a side view of a metallic cup of the motor unit.

The metallic cup 57 provided for the motor 5 includes: a circular bottom wall 572; a peripheral wall 573 extended from the peripheral edge of the bottom wall 572; and an opening edge portion 574 formed in a flange shape at the tip of the peripheral wall 573 (see FIGS. 5 and 6). The peripheral wall 573 is extended along the thickness of the bottom wall 572.

The metallic cup 57 is typically made of aluminum. However, this is only an example and should not be construed as limiting. Alternatively, the metallic cup 57 may also be made of iron, a magnesium alloy, titanium, or any other suitable material.

The opening edge portion 574 having an annular shape has: a plurality of screw holes 575 arranged circumferentially at intervals; a plurality of protrusions 576 also arranged circumferentially at intervals; and an annular groove 577 (see FIG. 6).

The plurality of screw holes 575 are provided to receive a plurality of screws 571 to be screwed thereto one to one. The plurality of protrusions 576 are provided to position the metallic cup 57 by being fitted into recesses on the outer surface of the first divided part 41. The groove 577 is provided to receive an O-ring 49. The groove 577 is provided over the entire circumference of the opening edge portion 574.

The groove 577 is located radially inside of (i.e., closer to the center of the opening of the metallic cup 57 than) the plurality of screw holes 575 and the plurality of protrusions 576. The profile of the groove 577 is not a perfect circle but is bent radially inward in regions where the screw holes 575 and the protrusions 576 are provided (see FIG. 6). This allows the motor unit 3 according to this embodiment to decrease the external dimension of the opening edge portion 574 of the metallic cup 57. However, this is only an example of the present disclosure and should not be construed as limiting. Alternatively, the groove 577 may also be formed to have a perfect circular profile.

To fix the metallic cup 57 onto the outer surface of the first divided part 41, a plurality of screws 571 may be inserted through the opening of the first divided part 41 (see FIG. 4) and screwed into their corresponding screw holes 575 through the first divided part 41. This allows the opening edge portion 574 of the metallic cup 57 to be hermetically fixed onto the outer surface of the first divided part 41 via the O-ring 49 with elasticity. Interposing the O-ring 49 between the metallic cup 57 and the unit case 4 achieves the advantage of reducing the transmission of vibrations.

As shown in FIG. 3, the motor 5 includes: a circular columnar rotary shaft 51; a rotor 52 coupled to the rotary shaft 51 to rotate along with the rotary shaft 51; and a circular cylindrical stator 53 arranged to surround the rotor 52.

The metallic cup 57 houses an axial part of the rotary shaft 51 (specifically, an axial half of the rotary shaft 51), the rotor 52, and a part of the stator 53 (specifically, most of the stator 53). Through the opening of the metallic cup 57, the rest of the rotary shaft 51 (specifically, the other axial half of the rotary shaft 51) and the rest of the stator 53 (specifically, a resin molded part of the stator 53) protrude.

On the inner surface of the bottom wall 572 of the metallic cup 57, provided is a recess 578 to receive a bearing 552. The bearing 552 is provided to rotatably support an axial end portion of the rotary shaft 51. The other axial end portion of the rotary shaft 51 is rotatably supported by another bearing 551 placed in another recess 428 provided on the inner surface of the second divided part 42.

On the outer peripheral surface of a portion, protruding from the metallic cup 57, of the rotary shaft 51, formed are teeth 54 to mesh with the speed reducer 31.

In the motor unit 3 according to this exemplary embodiment, an inner peripheral surface 570 of the metallic cup 57 (i.e., the inner peripheral surface of the metallic peripheral wall 573) is, over the entire circumference thereof, in pressure contact with the outer peripheral surface 530 of the stator 53 sufficiently closely. As used herein, bringing the inner peripheral surface 570 of the metallic cup 57 into pressure contact with the stator 53 means bringing, with pressure, the inner peripheral surface 570 of the metallic cup 57 into contact with the stator 53. Between the inner peripheral surface 570 of the metallic cup 57 and the outer peripheral surface 530 of the stator 53, applied is pressure that causes the inner peripheral surface 570 and the outer peripheral surface 530 to be pressed against each other.

The metallic cup 57 is thermally inserted to the stator 53. Specifically, the metallic cup 57 is fitted onto the stator 53 after having been heated and expanded. When the metallic cup 57 shrinks as its temperature decreases after that, the metallic cup 57 is brought into pressure contact with the stator 53 closely. The inner peripheral surface 570 of the metallic cup 57 is an annular continuous metallic surface. The inner peripheral surface 570 of the metallic cup 57 makes, over the entire circumference thereof, close contact under pressure with the outer peripheral surface 530 of the stator 53.

A non-resin-molded part of the outer peripheral surface 530 of the stator 53 is the metallic surface 535. The stator 53 is resin-molded not entirely but only partially such that at least the metallic surface 535 is exposed on the outer periphery thereof. The metallic surface 535 is the outer peripheral surface of an iron core 533 of the stator 53. A coil 534 wound around the iron core 533 is resin-molded.

As can be seen, in the motor unit 3 according to the exemplary embodiment, the stator 53 is resin-molded entirely but a part thereof. That part includes a portion, designed to be in pressure contact with the inner peripheral surface 570 of the metallic cup 57, of the stator 53 (i.e., the outer peripheral surface 530 of the stator 53).

Thus, the heat generated inside the motor 5 is directly transferred from the stator 53 to the metallic cup 57 and is efficiently dissipated through the metallic cup 57 into the open air. The surface of the metallic cup 57 may be exposed to the air blowing against the electric bicycle traveling. As will be described later with respect to variations, the stator 53 does not have to be resin-molded.

As shown in FIG. 5, an anti-rotation pin 48 is provided between the metallic cup 57 and the stator 53. On the outer peripheral surface 530 of the stator 53, a linear groove 538 is formed to which part of the pin 48 is fitted. On the inner peripheral surface 570 of the metallic cup 57, a linear groove 579 is formed to which another part of the pin 48 is fitted (see FIG. 6).

The pin 48 is arranged parallel to the axis of the motor 5 (i.e., the axis of the rotary shaft 51). Fitting the pin 48 between the metallic cup 57 and the stator 53 allows the relative rotation of the metallic cup 57 with respect to the stator 53 to be checked with more reliability.

In addition, in the motor unit 3 according to the exemplary embodiment, the stator 53 includes a portion 531 protruding through the opening of the metallic cup 57 (see FIG. 4). This portion 531 serves as a guide when the O-ring 49 is attached.

The foregoing description is focused on the structure of the motor 5. Next, various types of mechanisms to be housed in the unit case 4 will be described.

As shown in FIG. 3, in the unit case 4, the input shaft 6 is housed to be rotatable around the axis 60 thereof. The first divided part 41 has a through hole 411 into which the input shaft 6 is inserted. The second divided part 42 also has a through hole 421 into which the input shaft 6 is inserted.

To both end portions of the input shaft 6, fixed are crank arms 18. To the tip of each of these crank arms 18, attached rotatably is a pedal 181 (see FIG. 1). The rider may apply manual rotational force to the input shaft 6 by pumping the pedals 181.

In the unit case 4, the input body 7 is arranged along the outer peripheral surface of the input shaft 6. The input body 7 is a cylindrical member and rotates along with the input shaft 6.

The input body 7 is divided into a first input body 71 and a second input body 72. The first input body 71 is coupled to the input shaft 6 in the first divided part 41. The second input body 72 is coupled to the first input body 71 in the second divided part 42. The second input body 72 transmits rotational force to the output body 8.

The output body 8 is a cylindrical member and is arranged rotatably along the outer peripheral surface of the input shaft 6. One end portion of the output body 8 passes through the through hole 421 of the second divided part 42 to protrude out of the unit case 4.

A front sprocket 191 is fixed to the portion, protruding out of the unit case 4, of the output body 8. The front sprocket 191 rotates along with the output body 8. A rear sprocket 192 is fixed to a hub of the rear wheel 112 (see FIG. 1). A chain 193 is hung around between the front sprocket 191 and the rear sprocket 192.

As shown in FIG. 3, in the unit case 4, a one-way clutch 32 is arranged to be located between the input body 7 and the output body 8. The one-way clutch 32 is configured to, when rotational force is applied in an accelerating direction to the input body 7, transmit the rotational force to the output body 8 and is also configured to, when rotational force is applied in a decelerating direction to the input body 7, stop transmitting the rotational force to the output body 8. As used herein, the "accelerating direction" refers to the direction in which the electric bicycle 1 is accelerated in its traveling direction, and the "decelerating direction" is opposite from the accelerating direction.

The output body 8 includes a web 81 and a rim 82 as its integral members. The web 81 protrudes radially outward with respect to the output body 8. The rim 82 is continuous with a radially outer end portion of the web 81. On the outer peripheral surface of the rim 82, formed are teeth 83 to mesh with the speed reducer 31.

The speed reducer 31 housed in the unit case 4 is configured to reduce the number of revolutions of the motor 5 and transmit reduced rotational force to the output body 8.

The speed reducer 31 includes a rotary shaft 310 and a first transmission gear 311 and a second transmission gear 312, both of which are supported by the rotary shaft 310.

The first transmission gear 311 is a cylindrical member to receive the rotational force from the rotary shaft 51 of the motor 5. On the outer peripheral surface of the first transmission gear 311, formed are teeth 313 to mesh with the teeth 54 of the rotary shaft 51.

The rotary shaft 310 is housed rotatably in the unit case 4 such that its axis is aligned with the rightward/leftward direction. One end portion of the rotary shaft 310 is supported rotatably by a bearing 314 arranged in the second divided part 42.

The first transmission gear 311 is coupled to the rotary shaft 310 via a one-way clutch 315.

The one-way clutch 315 is configured to, when rotational force is applied in an accelerating direction to the first transmission gear 311, transmit the rotational force to the rotary shaft 310 and is also configured to, when rotational force is applied in a decelerating direction to the first transmission gear 311, stop transmitting the rotational force to the rotary shaft 310.

The second transmission gear 312 is fixed to the rotary shaft 310 so as to rotate along with rotary shaft 310. The second transmission gear 312 transmits the rotational force transmitted from the first transmission gear 311 via the rotary shaft 310 to the teeth 83 of the output body 8. On the outer peripheral surface of the second transmission gear 312, formed are teeth 316 to mesh with the teeth 83.

The motor unit 3 according to the exemplary embodiment has such a configuration. Thus, when the input shaft 6 rotates in the accelerating direction as the rider pumps the pedals 181 of the electric bicycle 1, the first input body 71 and the second input body 72 also rotate along with the input shaft 6. When the rotational force in the accelerating direction of the second input body 72 is transmitted to the output body 8 via the one-way clutch 32, the output body 8 and the front sprocket 191 rotate in the accelerating direction. As the front sprocket 191 rotates in the accelerating direction, its rotational force is transmitted via the chain 193 to the rear sprocket 192, thus causing the rear sprocket 192 to rotate in the accelerating direction and thereby driving the rear wheel 112 in rotation in the accelerating direction.

In addition, the motor unit 3 according to the exemplary embodiment may apply the rotational force output from the motor 5 to the output body 8 as will be described below.

As the rotary shaft 51 of the motor 5 rotates in the accelerating direction, the first transmission gear 311 engaged with rotary shaft 51 also rotates in the accelerating direction. The rotational force in the accelerating direction of the first transmission gear 311 is transmitted to the rotary shaft 310 and the second transmission gear 312 via the one-way clutch 315, thus causing the second transmission gear 312 to rotate in the accelerating direction. The rotational force in the accelerating direction of the second transmission gear 312 is transmitted to the output body 8. To the output body 8, transmitted in combination are the rotational force produced by the motor 5 and the rotational force generated by the rider who is pumping the pedals 181.

In the electric bicycle 1 according to the exemplary embodiment, a control unit included in the control board 35 controls the rotation of the motor 5 in accordance with a torque applied to the input shaft 6 and the number of revolutions per unit time of the input shaft 6. The torque applied to the input shaft 6 is detected by a torque detector 33 housed in the unit case 4. The torque detector 33 is a magnetostriction torque detector including a magnetostriction generation unit 331 formed on the outer peripheral surface of the first input body 71 and a coil 332 arranged at a very narrow interval from the magnetostriction generation unit 331.

The number of revolutions per unit time of the input shaft 6 is detected by a rotation detector 34. The rotation detector 34 is an optical rotation detector including a rotator 341 that rotates along with the input body 7 and an optical sensor 342 arranged at a very narrow interval from the rotator 341.

The control unit of the control board 35 may include, for example, a microcomputer and controls the operation of the respective constituent elements by executing a program stored on a storage medium such as a read-only memory (ROM). A known control unit may be used as appropriate as this control unit.

In the motor unit 3 according to the exemplary embodiment having such a configuration, the heat in the stator 53 is directly transferred to the metallic cup 57 through the metallic surface 535 and then is dissipated efficiently from the outer surface of the metallic cup 57. In addition, since the amount of the resin used as its material is reduced, the motor unit 3 may have a lighter overall weight.

(Variations)

Next, some variations of the motor unit 3 and electric bicycle 1 according to the exemplary embodiment will be described. In the following description of variations, any constituent element, having the same function as a counterpart of the exemplary embodiment described above, will be designated by the same reference numeral as that counterpart's, and a detailed description thereof will be omitted herein.

Figure 7:
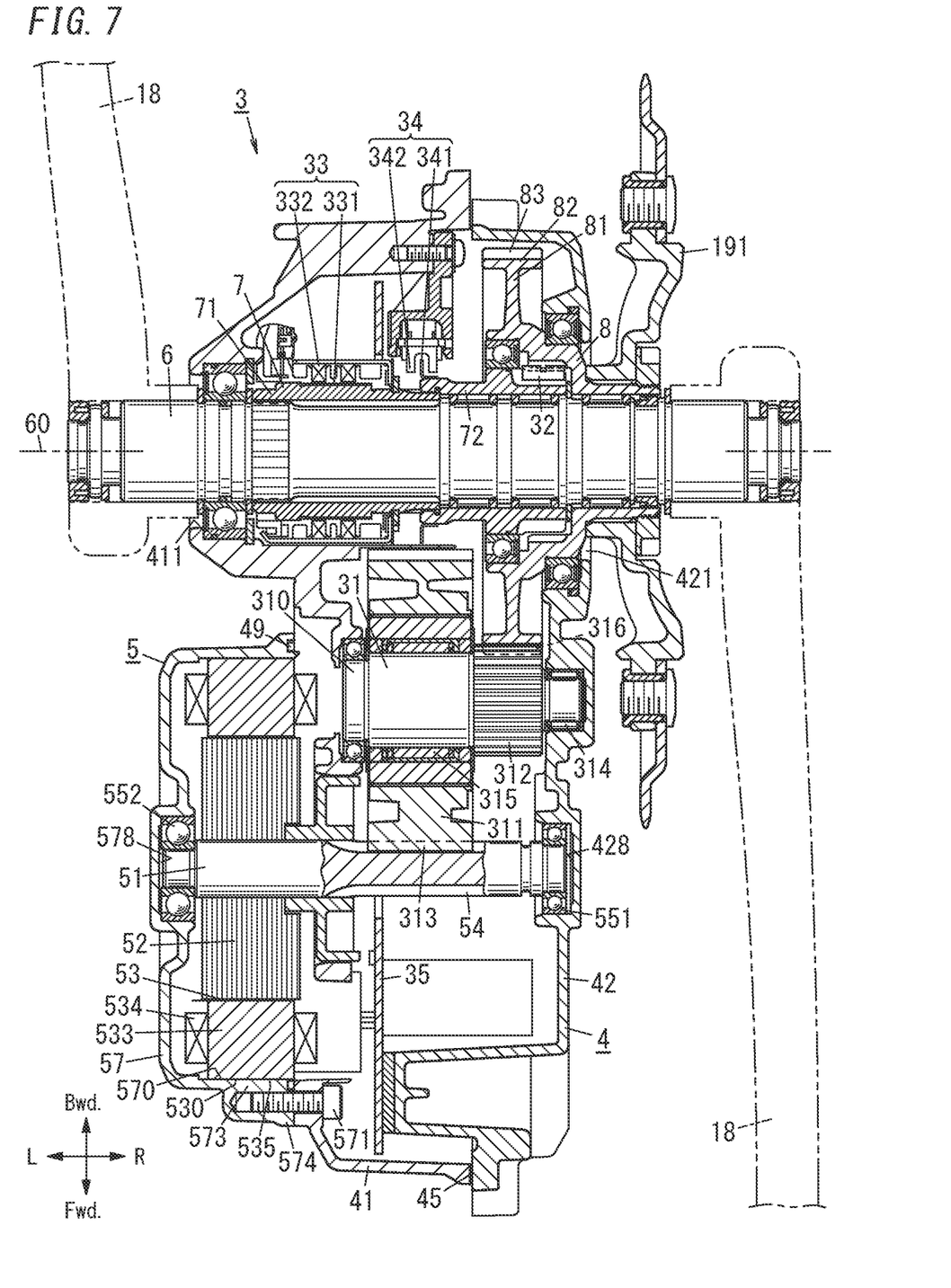
FIG. 7 is a cross-sectional view illustrating a first variation of the motor unit.

FIG. 7 illustrates a cross section of a first variation of the motor unit 3. In the motor unit 3 shown in FIG. 3 and other drawings, the stator 53 is resin-molded partially. Meanwhile, according to the first variation of the motor unit 3, the stator 53 is not resin-molded.

That is to say, neither the iron core 533 of the stator 53 nor the coil 534 wound around the iron core 533 is resin-molded. The metallic surface 535 constituted by the outer peripheral surface of the iron core 533 and the inner peripheral surface 570 of the metallic cup 57 are in close contact with each other with pressure that causes these surfaces 535, 570 to be pressed against each other.

In the first variation of the motor unit 3, the stator 53 is not resin-molded, and therefore, the motor 5 may have an even lighter overall weight. Meanwhile, if the stator 53 is resin-molded entirely but the metallic surface 535 (i.e., in the embodiment shown in FIG. 3 and other drawings), the advantages are achieved in that a steep increase in the temperature of the stator 53 is reduced due to the heat storage property of the resin portion, the resin portion reduces noise and vibrations, and the resin portion increases the degree of insulation between the coil 534 and the metallic cup 57.

Figure 8:
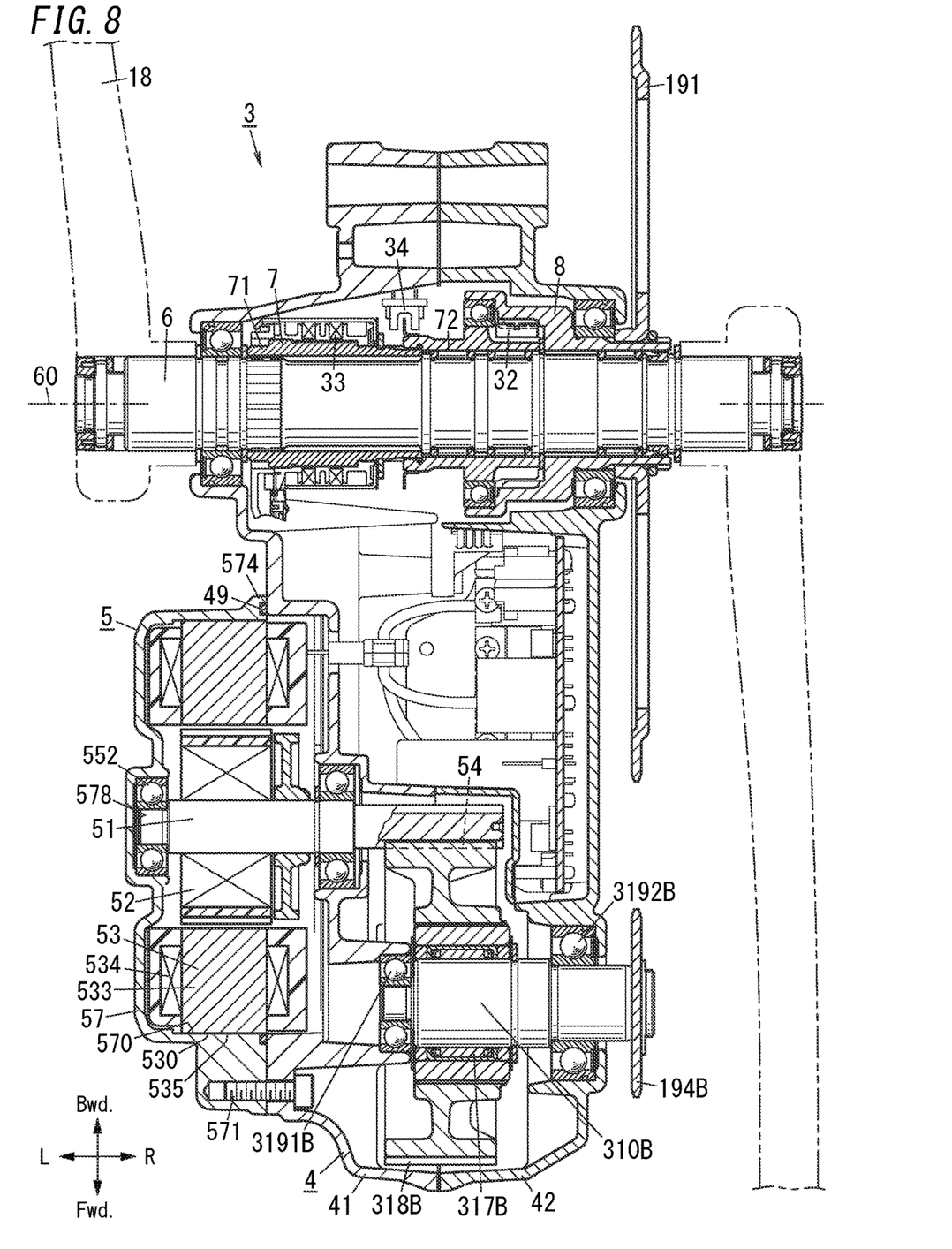
FIG. 8 is a cross-sectional view illustrating a second variation of the motor unit.

FIG. 8 illustrates a cross section of a second variation of the motor unit 3. The motor unit 3 shown in FIG. 3 and other drawings is a so-called "uniaxial motor unit." On the other hand, the second variation of the motor unit 3 is a biaxial motor unit 3.

In the second variation of the motor unit 3, the motor unit 3 includes a second output body 310B, which is different from the output body 8.

A first end portion of the second output body 310B is located in the unit case 4. The second output body 310B is supported rotatably by a bearing 3191B arranged in the first divided part 41 and a bearing 3192B arranged in the second divided part 42.

A second end portion of the second output body 310B protrudes out of the unit case 4. To the second end portion of the second output body 310B, fixed is a sprocket 194B. A chain 193 is hung around the sprocket 194B.

On the outer peripheral surface of the second output body 310B, mounted via a one-way clutch 317B is a gear 318B with a large diameter. The gear 318B meshes with the teeth 54 on the rotary shaft 51 of the motor 5.

In the electric bicycle 1 including the second variation of the motor unit 3, when the rotary shaft 51 of the motor 5 rotates in the accelerating direction while the rider is traveling by pumping the pedals 181, the gear 318B rotates in the accelerating direction and the rotational force is transmitted via the one-way clutch 317B to the second output body 310B and then is further transmitted to the chain 193.

Next, a third variation of the motor unit 3 will be described with reference to FIG. 9.

In the third variation of the motor unit 3, the first divided part 41 of the unit case 4 made of a metallic material includes, as an integral part thereof, a first heat dissipating portion 414. A portion of the first divided part 41 is formed to be thicker than a surrounding portion thereof. That thicker portion of the first divided part 41 constitutes the first heat dissipating portion 414 made of a metallic material and bulging inward in the unit case 4.

The first heat dissipating portion 414 is connected to a first surface 351 along the thickness of the control board 35 via a first thermally conductive sheet 91 serving as a thermally conductive member 9. As used herein, if something is "connected to" anything else, then the two things may naturally be directly in contact with each other with no other member interposed between them but may also be indirectly connected together with another member interposed between them. A contact surface between the thermally conductive member 9 and the control board 35 is at a side of the first divided part 41 with respect to a mating surface 45 of the first and second divided parts 41, 42.

The thickness of the control board 35 is the thickness of a printed wiring board 354 included in the control board 35 and corresponds to the rightward/leftward direction in the third variation of the motor unit 3. The first surface 351 of the control board 35 is one surface along the thickness of the printed wiring board 354 and forms a principal part thereof. A second surface 352 of the control board 35 is another surface along the thickness of the printed wiring board 354 and forms a principal part thereof.

The control board 35 further includes a plurality of electrical components 353 assembled together on the printed wiring board 354. The plurality of electrical components 353 includes not only capacitors 3532 and integrated circuits 3533, for example, but also heat generating elements 3531 which tend to generate heat particularly easily. Examples of the heat-generating elements 3531 include not only a switching element such as a field-effect transistor (FET), a diode, and a coil, which are used to supply power to the motor 5, but also various types of resistors and connectors, for example.

The second divided part 42 of the unit case 4 includes a second heat dissipating portion 424 as an integral part thereof. In the third variation of the motor unit 3, a portion of the second divided part 42 is formed to be recessed inward with respect to a surrounding portion thereof. The bottom of the recessed portion of the second divided part 42 constitutes the second heat dissipating portion 424 made of a metallic material and bulging inward in the unit case 4.

The second heat dissipating portion 424 is connected to the second surface 352 of the control board 35 via a second thermally conductive sheet 92 serving as a thermally conductive member 9. The second surface 352 is a surface facing the opposite direction from the first surface 351.

A plurality of heat-generating elements 3531 is in contact with the second thermally conductive sheet 92. The heat generated by the plurality of heat generating elements 3531 is efficiently dissipated from the outer surface of the unit case 4 via the second thermally conductive sheet 92 and the second heat dissipating portion 424.

Note that the number of the heat generating elements 3531 in contact with the second thermally conductive sheet 92 does not have to be plural but may also be singular. Also, a single or plurality of heat generating elements 3531 may be in contact with the first thermally conductive sheet 91. A single or a plurality of heat generating elements 3531 may be in contact with each of the first thermally conductive sheet 91 and the second thermally conductive sheet 92.

As can be seen, in the third variation of the motor unit 3, the first heat dissipating portion 414 forming an integral part of the unit case 4 is connected to the first surface 351 of the control board 35 and the second heat dissipating portion 424 forming an integral part of the unit case 4 is connected to the second surface 352 of the control board 35. Since the heat generated from the control board 35 (e.g., the heat generated by the heat generating elements 3531) is efficiently dissipated from both sides thereof along its thickness, the motor unit 3 for use in electric bicycles may have its heat dissipation capability improved.

In the third variation of the motor unit 3, the control board 35 may have its heat dissipation capability improved, and the plurality of heat generating elements 3531 may be assembled together on the printed wiring board 354 at narrower intervals, thus reducing the size of the control board 35.

Figure 9:
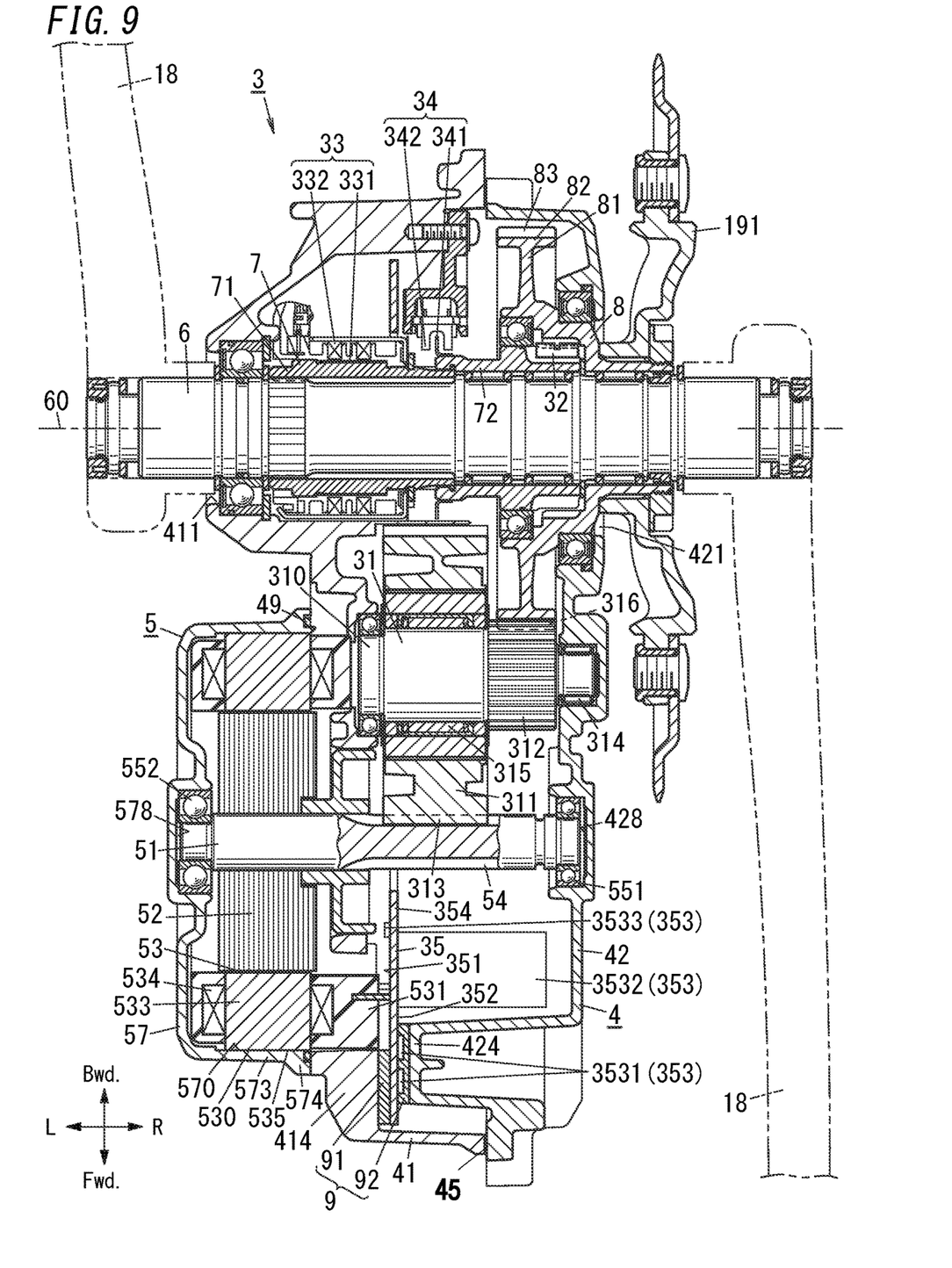
FIG. 9 is a cross-sectional view illustrating a third variation of the motor unit.

As shown in FIG. 9, in the third variation of the motor unit 3, when viewed along the thickness of the control board 35 (i.e., when viewed in the rightward/leftward direction), the first heat dissipating portion 414 and the second heat dissipating portion 424 are both located to overlap with the heat generating elements 3531. This allows the heat generated by the heat generating elements 3531 to be efficiently dissipated via the first heat dissipating portion 414 and the second heat dissipating portion 424. The first heat dissipating portion 414 and the second heat dissipating portion 424 may be each located so as to partially overlap with the heat generating elements 3531.

As shown in FIG. 9, when viewed along the thickness of the control board 35, the first heat dissipating portion 414 is located to overlap with the second heat dissipating portion 424. In the third variation of the motor unit 3, a portion of the control board 35 (specifically, a side edge portion, located more distant from the input shaft 6, of the control board 35) is sandwiched from both sides between the first heat dissipating portion 414 and the second heat dissipating portion 424. This not only improves the heat dissipation capability of the control board 35 but also allows the control board 35 to be fixed with more reliability, thus improving the vibration resistance of the motor unit 3. The first heat dissipating portion 414 needs to be located to at least partially overlap with the second heat dissipating portion 424.

In the third variation of the motor unit 3, the thermally conductive member 9 includes both the first thermally conductive sheet 91 and the second thermally conductive sheet 92. However, this is only an example of the present disclosure and should not be construed as limiting. Alternatively, the thermally conductive member 9 may include either the thermally conductive sheet 91 or the second thermally conductive sheet 92, with the other sheet omitted.

If the thermally conductive member 9 does not include the first thermally conductive sheet 91, the first heat dissipating portion 414 is directly in contact with the first surface 351 of the control board 35. If the thermally conductive member 9 does not include the second thermally conductive sheet 92, the second heat dissipating portion 424 is directly in contact with the second surface 352 of the control board 35.

Also, in the third variation of the motor unit 3, the first thermally conductive sheet 91 and the second thermally conductive sheet 92 are formed out of mutually different sheet members. However, this is only an example of the present disclosure and should not be construed as limiting. Alternatively, the first thermally conductive sheet 91 and the second thermally conductive sheet 92 may also be formed out of the same sheet member. That is to say, a part of the sheet member constituting the thermally conductive member 9 may serve as the first thermally conductive sheet 91 and another part of the sheet member may serve as the second thermally conductive sheet 92.

Note that the first to third variations described above are some of numerous variations. In the metallic cup 57, at least part of the stator 53 and at least part of the rotor 52 need to be housed. In the exemplary embodiment and the first to third variations thereof, part of the stator 53 protrudes from the opening of the metallic cup 57. However, this is only an example of the present disclosure and should not be construed as limiting. Alternatively, the stator 53 may be entirely housed in the metallic cup 57. In the exemplary embodiment and the first to third variations thereof, the electric bicycle equipped with the motor unit 3 is implemented as a so-called "electric assist bicycle." However, this is only an example of the present disclosure and should not be construed as limiting. Alternatively, the electric bicycle may also be an e-bike designed to drive the wheels 11 in rotation with only the rotational force of the motor 5. Furthermore, the electric bicycle according to the exemplary embodiment and the first to third variations includes two wheels 11. However, the number of the wheels 11 provided is not limited to any particular number but may also be three, for example.

Furthermore, in the exemplary embodiment and the first to third variations thereof, the metallic cup 57 and the stator 53 are fixed to each other by thermal insertion technique. Optionally, an adhesive may be further applied between the metallic cup 57 and the stator 53 (e.g., between the inner peripheral surface 570 of the metallic cup 57 and the outer peripheral surface 530 of the stator 53). That is to say, the metallic cup 57 and the stator 53 may be fixed to each other not only by thermal insertion but also with an adhesive as well. Alternatively, the metallic cup 57 may be brought into pressure contact with the stator 53 by any technique other than thermal insertion (e.g., by press fitting). Still alternatively, the metallic cup 57 and the stator 53 may be fixed to each other not only by the alternative technique but also with an adhesive as well.

(Aspects)

As can be seen easily from the foregoing description of an exemplary embodiment and its variations, a motor unit (3) according to a first aspect is designed to be used in electric bicycles. The motor unit (3) includes a motor (5) and a unit case (4) to which the motor (5) is fitted. The motor (5) includes: a stator (53); a rotor (52) arranged to be surrounded with the stator (53); a rotary shaft (51) fixed to the rotor (52); and a metallic cup (57) to house the stator (53) and the rotor (52) at least partially. The metallic cup (57) has an opening. An inner peripheral surface (570) of the metallic cup (57) is in pressure contact with the stator (53).

In the motor unit (3) according to the first aspect, the heat generated from the stator (53) is transferred to the metallic cup (57) that is in pressure contact with the stator (53) and may be efficiently dissipated through the metallic cup (57). This improves the heat dissipation capability of the motor unit (3) for use in electric bicycles. In addition, the motor unit (3) according to the first aspect may have its overall weight further lightened by adopting the metallic cup (57).

A motor unit (3) according to a second aspect may be implemented in combination with the first aspect. In the motor unit (3) according to the second aspect, at least part of an outer peripheral surface (530) of the stator (53) is a metallic surface (535). The inner peripheral surface (570) of the metallic cup (57) is in pressure contact with the metallic surface (535).

In the motor unit (3) according to the second aspect, the inner peripheral surface (570) of the metallic cup (57) is in pressure contact with the metallic surface (535), of which the properties make the surface sufficiently smooth and easy to transfer heat. This allows the heat to be transferred easily between the metallic cup (57) and the stator (53), thus achieving excellent heat dissipation capability.

A motor unit (3) according to a third aspect may be implemented in combination with the first or second aspect. In the motor unit (3) according to the third aspect, the stator (53) is resin-molded entirely but a particular part thereof. The particular part includes a portion, with which the metallic cup (57) is in pressure contact, of the stator (53).

In the motor unit (3) according to the third aspect, providing the resin-molded portion that partially covers the stator (53) reduces not only a steep increase in the temperature of the stator (53) but also vibrations as well. In addition, the presence of the resin-molded portion also increases the degree of insulation between the stator (53) and the metallic cup (57).

A motor unit (3) according to a fourth aspect may be implemented in combination with any one of the first to third aspects. The motor unit (3) according to the fourth aspect further includes a speed reducer (31) to which rotational force of the motor (5) is transmitted. The speed reducer (31) is housed in the unit case (4).

In the motor unit (3) according to the fourth aspect, the motor (5) and the speed reducer (31) are provided as a unit.

A motor unit (3) according to a fifth aspect may be implemented in combination with the fourth aspect. The motor unit (3) according to the fifth aspect further includes an O-ring (49) interposed between the unit case (4) and the metallic cup (57). The metallic cup (57) has an opening edge portion (574), against which the O-ring (49) is pressed.

In the motor unit (3) according to the fifth aspect, the O-ring (49) may increase the degree of close contact between the metallic cup (57) and the unit case (4) and also reduce the transmission of vibrations as well.

A motor unit (3) according to a sixth aspect may be implemented in combination with the fifth aspect. In the motor unit (3) according to the sixth aspect, the stator (53) includes a portion (531) protruding from the metallic cup (57) through the opening.

In the motor unit (3) according to the sixth aspect, the portion (531), protruding from the metallic cup (57), of the stator (53) may serve as a guide when the O-ring (49) is fitted.

A motor unit (3) according to a seventh aspect may be implemented in combination with any one of the first to sixth aspects. In the motor unit (3) according to the seventh aspect, the metallic cup (57) is thermally inserted into the stator (53).

In the motor unit (3) according to the seventh aspect, the metallic cup (57) may be brought into pressure contact with the stator (53) sufficiently closely.

A motor unit (3) according to an eighth aspect may be implemented in combination with any one of the first to seventh aspects. In the motor unit (3) according to the eighth aspect, the motor (5) further includes a bearing (552) configured to rotatably support the rotary shaft (51). A portion of the metallic cup (57) has a recess (578) to receive the bearing (552).

In the motor unit (3) according to the eighth aspect, a structure for receiving the bearing (552) may be constituted by a part of the metallic cup (57), thus further lightening the weight of the motor unit (3).

An electric bicycle (1) according to a ninth aspect includes the motor unit (3) according to any one of the first to eighth aspects; and at least one wheel (11) to which rotational force is transmitted from the motor (5) of the motor unit (3).

The electric bicycle (1) according to the ninth aspect may improve the heat dissipation capability of the motor unit (3) and have a much lighter weight as well.

As can also be seen easily from the foregoing description of an exemplary embodiment and its variations (e.g., the third variation, among other things), a motor unit (3) according to a tenth aspect is designed to be used in electric bicycles and includes: a motor (5) having a rotary shaft (51); a unit case (4) to house the rotary shaft (51) partially; an input shaft (6) arranged in the unit case (4) to penetrate through the unit case (4) and to be rotatable around an axis (60); an input body (7) arranged around an outer peripheral surface of the input shaft (6) and configured to rotate along with the input shaft (6); an output body (8) arranged along the outer peripheral surface of the input shaft (6) and configured to rotate around the axis (60) upon receiving rotational force of the input body (7); and a control board (35) housed in the unit case (4) and configured to control rotation of the motor (5). The unit case (4) includes: a first heat dissipating portion (414) connected to a first surface (351) of the control board (35); and a second heat dissipating portion (424) connected to a second surface (352) of the control board (35). The second surface (352) is opposite from the first surface (351).

In the motor unit (3) according to the tenth aspect, the heat generated in the control board (35) may be efficiently dissipated from both sides via the first heat dissipating portion (414) and the second heat dissipating portion (424), thus improving the heat dissipation capability of the motor unit (3) for use in electric bicycles.

A motor unit (3) according to an eleventh aspect may be implemented in combination with the tenth aspect. The motor unit (3) according to the eleventh aspect further includes a thermally conductive member (9) arranged in the unit case (4). The thermally conductive member (9) is arranged between the first heat dissipating portion (414) and the control board (35) and/or between the second heat dissipating portion (424) and the control board (35).

In the motor unit (3) according to the eleventh aspect, the heat generated in the control board (35) may be dissipated more efficiently through the thermally conductive member (9).

A motor unit (3) according to a twelfth aspect may be implemented in combination with the eleventh aspect. In the motor unit (3) according to the twelfth aspect, the control board (35) includes an electrical component (353). The thermally conductive member (9) is in contact with the electrical component (353).

In the motor unit (3) according to the twelfth aspect, the heat generated by the electrical component board (353) may be dissipated efficiently through the thermally conductive member (9).

A motor unit (3) according to a thirteenth aspect may be implemented in combination with any one of the tenth to twelfth aspects. In the motor unit (3) according to the thirteenth aspect, the control board (35) includes a heat generating element (3531). At least one of the first heat dissipating portion (414) or the second heat dissipating portion (424) is arranged to overlap with the heat generating element (3531) when viewed along the thickness of the control board (35).

In the motor unit (3) according to the thirteenth aspect, the heat generated by the heat generating element (3531), of which the temperature tends to increase particularly significantly on the control board (35), may be dissipated even more efficiently.

A motor unit (3) according to a fourteenth aspect may be implemented in combination with any one of the tenth to thirteenth aspects. In the motor unit (3) according to the fourteenth aspect, the first heat dissipating portion (414) is arranged to overlap with the second heat dissipating portion (424) when viewed along the thickness of the control board (35).

In the motor unit (3) according to the fourteenth aspect, the control board (35) is sandwiched from both sides between the first heat dissipating portion (414) and the second heat dissipating portion (424). This not only improves the heat dissipation capability but also allows the control board (35) to be fixed with more reliability, thus eventually increasing the vibration resistance of the motor unit (3).

An electric bicycle (1) according to a fifteenth aspect includes the motor unit (3) according to any one of the tenth to fourteenth aspects; and at least one wheel (11) to which rotational force is transmitted from the motor (5) of the motor unit (3).

The electric bicycle (1) according to the fifteen aspect may improve the heat dissipation capability of the motor unit (3) for use in electric bicycles.

REFERENCE SIGNS LIST

1 Electric Bicycle
11 Wheel
3 Motor Unit
31 Speed Reducer
4 Unit Case
49 O-Ring
5 Motor
51 Rotary Shaft
52 Rotor
53 Stator
530 Outer Peripheral Surface
535 Metallic Surface
552 Bearing
57 Metallic Cup
570 Inner Peripheral Surface
574 Opening Edge Portion
578 Recess

The invention claimed is:

1. A motor unit for use in electric bicycles, the motor unit comprising:
a motor having a rotary shaft;
a unit case to house the rotary shaft partially;
an input shaft arranged in the unit case to penetrate through the unit case and to be rotatable around an axis;
an input body arranged around an outer peripheral surface of the input shaft and configured to rotate along with the input shaft;
an output body arranged along the outer peripheral surface of the input shaft and configured to rotate around the axis upon receiving rotational force of the input body;
a one-way clutch arranged to be located between the input body and the output body; and
a control board housed in the unit case and configured to control rotation of the motor,
the unit case including:
a first heat dissipating portion connected to a first surface of the control board; and
a second heat dissipating portion connected to a second surface opposite from the first surface of the control board
the input body including:
a first input body coupled to the input shaft; and
a second input body configured to transmit rotational force to the output body;
the second input body being arranged radially inside the one-way clutch;
the output body being arranged radially outside the one-way clutch.

2. The motor unit of claim 1, further comprising a thermally conductive member arranged in the unit case, wherein
the thermally conductive member is arranged between the first heat dissipating portion and the control board and/or between the second heat dissipating portion and the control board.

3. The motor unit of claim 2, wherein
the control board includes an electrical component, and
the thermally conductive member is in contact with the electrical component.

4. The motor unit of claim 2, wherein
the control board includes a heat generating element,
at least one of the first heat dissipating portion or the second heat dissipating portion is arranged to overlap with the heat generating element when viewed along the thickness of the control board,
the second heat dissipating portion is connected to the control board via a second thermally conductive member included in the thermally conductive member, and
a plurality of the heat generating elements is in contact with the second thermally conductive member.

5. The motor unit of claim 4, wherein
the first heat dissipating portion is connected to the control board via a first thermally conductive member included in the thermally conductive member, and
a plurality of the heat generating elements is in contact with the first thermally conductive member.

6. The motor unit of claim 1, wherein
the control board includes a heat generating element, and
at least one of the first heat dissipating portion or the second heat dissipating portion is arranged to overlap with the heat generating element when viewed along the thickness of the control board.

7. The motor unit of claim 1, wherein
the first heat dissipating portion is arranged to overlap with the second heat dissipating portion when viewed along the thickness of the control board.

8. The motor unit of claim 1, wherein
the unit case includes a first divided part that includes, as an integral part thereof, the first heat dissipating portion,
a portion of the first divided part is formed to be thicker than a surrounding portion thereof, and
that thicker portion of the first divided part constitutes the first heat dissipating portion bulging inward in the unit case.

9. The motor unit of claim 1, wherein
the unit case includes a second divided part that includes, as an integral part thereof, the second heat dissipating portion,
a portion of the second divided part is formed to be recessed inward with respect to a surrounding portion thereof, and
the bottom of the recessed portion of the second divided part constitutes the second heat dissipating portion bulging inward in the unit case.

10. The motor unit of claim 9, wherein
the output body is a cylindrical member and is arranged rotatably along the outer peripheral surface of the input shaft, and
one end portion of the output body passes through the through hole of the second divided part to protrude out of the unit case.

11. The motor unit of claim 1, wherein
a side edge portion, located more distant from the input shaft, of the control board is sandwiched from both sides between the first heat dissipating portion and the second heat dissipating portion.

12. The motor unit of claim 1, wherein
at least one of the first heat dissipating portion or the second heat dissipating portion is adjacent to the motor.

13. The motor unit of claim 1, wherein
at least one of the first heat dissipating portion or the second heat dissipating portion is arranged to overlap with the motor when viewed along the axis of the rotary shaft.

14. The motor unit of claim 1, wherein
the control board includes a capacitor,
the capacitor is arranged to overlap with the motor when viewed along the axis of the rotary shaft.

15. The motor unit of claim 1, wherein
the first heat dissipating portion and the second heat dissipating portion are provided on an inner surface of the unit case.

16. The motor unit of claim 1, wherein
The control board is on at least one of the first heat dissipating portion or the second heat dissipating portion.

17. The motor unit of claim 1, further comprising a speed reducer to which rotational force of the motor is transmitted, wherein
at least one of the first heat dissipating portion or the second heat dissipating portion is located more distant from the input shaft than the speed reducer.

18. An electric bicycle comprising:
the motor unit of claim 1; and
at least one wheel to which rotational force is transmitted from the motor of the motor unit.

19. A motor unit for use in electric bicycles, the motor unit comprising:
a motor having a rotary shaft;
a unit case to house the rotary shaft partially;
an input shaft penetrating through the unit case and being rotatable around an axis;
an input body arranged around an outer peripheral surface of the input shaft and configured to rotate along with the input shaft;
an output body arranged along the outer peripheral surface of the input shaft and configured to rotate around the axis upon receiving rotational force of the input body;
a one-way clutch arranged to be located between the input body and the output body;
a control board housed in the unit case, the control board having a first surface and a second surface opposite from the first surface, the control board being configured to control rotation of the motor;
a first thermally conductive member in contact with the first surface;
a first heat dissipating portion in contact with the first thermally conductive member to conduct heat of the control board to an outer shell of the motor unit;
a second thermally conductive member in contact with the second surface; and
a second heat dissipating portion in contact with the second thermally conductive member to conduct heat of the control board to the outer shell of the motor unit;
the input body including:
a first input body coupled to the input shaft; and
a second input body configured to transmit rotational force to the output body;
the second input body being arranged radially inside the one-way clutch;
the output body being arranged radially outside the one-way clutch.

20. A motor unit for use in electric bicycles, the motor unit comprising:
- a motor having a rotary shaft;
- a unit case to house the rotary shaft partially, the unit case having a first divided part and a second divided part;
- an input shaft arranged in the unit case to penetrate through the unit case and to be rotatable around an axis;
- an input body arranged around an outer peripheral surface of the input shaft and configured to rotate along with the input shaft;
- an output body arranged along the outer peripheral surface of the input shaft and configured to rotate around the axis upon receiving rotational force of the input body;
- a one-way clutch arranged to be located between the input body and the output body;
- a speed reducer housed in the unit case and configured to reduce a total number of revolutions of the motor and transmit reduced rotational force;
- a sprocket configured to output total force of manual rotational force transmitted to the input body and the reduced rotational force of the motor transmitted by the speed reducer;
- a control board housed in the unit case and configured to control rotation of the motor; and
- a thermally conductive member arranged in the unit case,
- the second divided part including a recessed portion formed to be recessed inward in the unit case with respect to a surrounding portion thereof,
- the recessed portion of the second divided part having a bottom including a heat dissipating portion,
- the heat dissipating portion being connected to the control board, the heat dissipating portion is connected to the control board via the thermally conductive member;
- the input body including:
  - a first input body coupled to the input shaft; and
  - a second input body configured to transmit rotational force to the output body;
- the second input body being arranged radially inside the one-way clutch;
- the output body being arranged radially outside the one-way clutch.

21. The motor unit of claim 20, wherein
a contact surface between the thermally conductive member and the control board is at a side of the first divided part with respect to a mating surface of the first and second divided parts.

22. The motor unit of claim 20, wherein
the control board includes an electrical component, and
the thermally conductive member is in contact with the electrical component.

23. The motor unit of claim 20, wherein
the heat dissipating portion is arranged to overlap with the motor when viewed along with the axis of the rotary shaft.

24. The motor unit of claim 20, wherein
the control board includes a capacitor,
the capacitor is arranged to overlap with the motor when viewed along with the axis of the rotary shaft.

25. The motor unit of claim 20, wherein
the heat dissipating portion is located more distant from the input shaft than the speed reducer.

26. The motor unit of claim 20, further comprising a torque detector housed in the unit case and configured to detect torque applied to the input shaft,
wherein the control board is arranged to overlap with the torque detector when viewed along the axis of the rotary shaft.

* * * * *